March 27, 1962 F. E. FROEHLICH 3,027,547

MAGNETIC CORE CIRCUITS

Filed Dec. 6, 1956 2 Sheets-Sheet 1

INVENTOR
F. E. FROEHLICH
BY [signature]
ATTORNEY

March 27, 1962 F. E. FROEHLICH 3,027,547

MAGNETIC CORE CIRCUITS

Filed Dec. 6, 1956 2 Sheets-Sheet 2

INVENTOR
F. E. FROEHLICH
BY [signature]
ATTORNEY

United States Patent Office 3,027,547
Patented Mar. 27, 1962

3,027,547

MAGNETIC CORE CIRCUITS

Fritz E. Froehlich, Morristown, N.J., assignor to Bell Telephone Laboratories, Incorporated, New York, N.Y., a corporation of New York Filed Dec. 6, 1956, Ser. No. 626,772
3 Claims. (Cl. 340—174)

This invention relates to magnetic memory devices utilizing magnetic cores and more particularly to magnetic core operation to improve switching speed in memory devices.

Mechanized memory in general utilizes two distinct conditions to represent any information upon which it operates. These two conditions are symbolized by the digits zero and one. Thus, any information may be processed by transforming it into combinations of two conditions equivalent to these two digits in binary, rather than decimal, form.

Magnetic cores are readily adaptable to use in mechanized memory because of their peculiar characteristic of distinct states of magnetic saturation which may be utilize to define the binary numbers zero and one. Thus, energizing a coil wound on a magnetic core may change or switch the magnetic sense of the core from saturation in one direction to saturation in the opposite direction. In so doing a change of magnetic field is produced, as shown by the familiar hysteresis loop, inducing a large signal in an output or sensing coil on the core which may represent one of the two binary digits. If the first coil is energized in a sense opposite to that which would switch it, the core will encounter only a slight change in magnetic field and produce a small "noise" signal in the sensing coil which may represent the other binary digit. The magnetic core will hold its magnetic sense virtually indefinitely, so that information may be "stored" in the core by setting the magnetic sense in one direction and "read out" of the core by energizing a coil on the core at a later time.

Mechanized memory systems are designed for extremely high operating speeds in order to convert information to and from the binary operating language in a time short compared to systems performing similar operations by other means. In systems including magnetic cores, it has been the general belief that, in order to distinguish between output pulses representing the "zero" and "one" operating conditions, it was necessary to switch the core completely between the two states of magnetic saturaion or, more precisely, states of maximum remanent flux.

A definite magnetic field or "drive" is required to switch a particular core between these stable states, which drive is dependent upon the magnitude of exciting current and the number of turns on the exciting current coil. Once having determined the drive required for the given coil, the time for completely switching the core is also established. Increasing the drive beyond that required for complete switching reduces the switching time, but in many applications the drive must be held to a low maximum value which in turn places a lower limit on complete switching time.

Properties of individual magnetic cores also affect switching speed. A magnetic core exhibiting a gradual slope in its hysteresis curve possesses properties which will compel a longer switching time than required in cores exhibiting more rectangular hysteresis curves. Unfortunately it is more difficult to obtain and, thus, less economical to employ the latter "fast" magnetic cores. In memory systems employing large numbers of cores, this "fast" core expense and limitations on driving field must be weighed against the speed required and frequently, but reluctantly, a compromise as to speed is accepted. Basically, then, memory systems employing magnetic cores have been limited in speed by the time required to switch a particular core between its two senses of magnetic saturation.

It is a general object of this invention to improve the performance of magnetic cores used in memory systems.

It is another object of this invention to increase the speed of operation of memory systems utilizing magnetic cores.

It is another object of this invention to provide a magnetic switch which removes the delay effect provided by complete switching of a magnetic core.

In distinguishing a switched core output signal from an unswitched "noise" signal as required in memory systems, the amplitude differential between the signals is of primary importance. The amplitude peak in a completely switched core output signal occurs approximately half way through the core magnetic flux reversal and is of sufficient amplitude over a range about the peak to permit discrimination at any point in the range from the peak amplitude of the "noise" signal.

In accordance with this invention, by applying sufficient drive to completely switch a magnetic core but removing the exciting current prior to completion of the switching operation, the core will assume a stable, partially switched condition. I have found that up to the point at which the excitation is removed, the waveform of the voltage signal induced in the output winding will match the waveform of the output signal produced by the core if completely switched. At this cutoff point the output signal drops abruptly to zero. Removal of the exciting current at about one-half the complete switching time permits an output signal equal in peak amplitude to that provided by complete switching and thus realizes the same discrimination from the noise signal. I have found also that reducing the excitation interval to as little as one-third of the complete switching time also results in an output signal which can be distinguished clearly from the "noise" signal. Thus, by substituting a stable condition of partial saturation for a stable condition of maximum remanent flux, operating time of magnetic memory cores may be reduced by a considerable amount without sacrifice of discrimination between output signals. One consequence is that this invention will permit slower magnetic cores, which operate at low exciting current values, to perform memory functions in the same time as fast, more expensive, cores, and with no increase in current required to excite the slower cores.

It is a feature of this invention that an exciting current be applied to a coil on a magnetic core sufficient to drive the core to complete saturation in one direction, that means be provided to remove the exciting current in a time less than required to reach complete saturation, and that an exciting current be applied sufficient to drive the core to complete saturation in the opposite direction.

It is another feature of this invention that the driving force applied to a magnetic core be stopped prior to complete switching of the core so that an output winding on the core will have a voltage induced therein equal in amplitude to the voltage induced therein by complete switching of the core.

It is a further feature of this invention that a magnetic core be partially switched to induce a voltage in an output winding sufficient to discriminate from a voltage induced in the output winding by driving the core in a sense opposite to that which would switch the core.

A complete understanding of this invention and of these and other features thereof may be gained from consideration of the following detailed description and the accompanying drawing in which.

Figure 1:
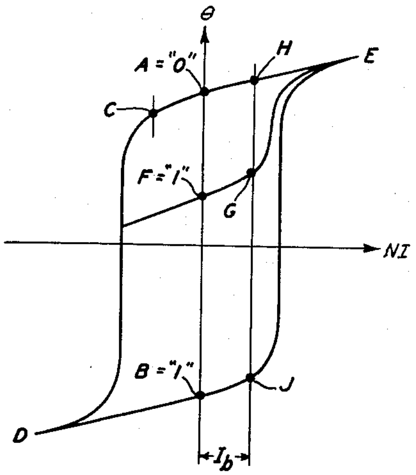
FIG. 1 is an idealized graph of the hysteresis curve of a magnetic core of the type employed in various memory circuits.

Referring now to FIG. 1, there is depicted a ferromagnetic core hysteresis loop in which the abscissa is the ampere turns NI of the core and the ordinate is the flux $\theta$ through the core. Point A represents one state of stable remanent magnetization while point B represents the other stable state of remanent magnetization. Subsequent reference will be made to this graph to explain the various embodiments of this invention.

Figure 2:
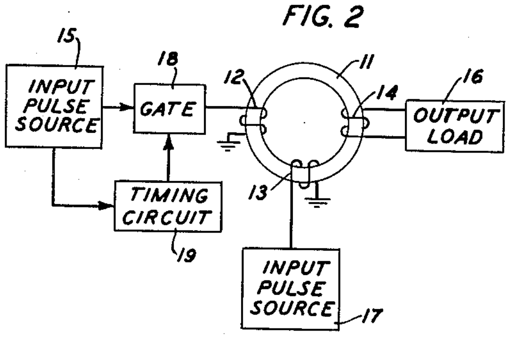
FIG. 2 depicts a magnetic core circuit in accordance with one embodiment of this invention.

FIG. 2 shows a magnetic core 11, advantageously displaying the square loop characteristics shown in FIG. 1. Core 11 has a pair of input windings 12 and 13 and an output winding 14. A current pulse from source 15 through winding 12 establishes an electromagnetic field in winding 12 tending to switch the core in a first state of stable remanent magnetization to the second state of stable remanent magnetization. Such switching of the core establishes an electro-magnetic field in output winding 14 causing a current flow in the load 16. Similarly, a current pulse from source 17 will tend to switch the core from the second state to the first state, again providing a current flow in the load 16. A current pulse from source 17 at a time when the core 11 is in the first state will not switch the core but will be effective to produce a smaller "noise" signal current flow in the load 16.

Figure 3:
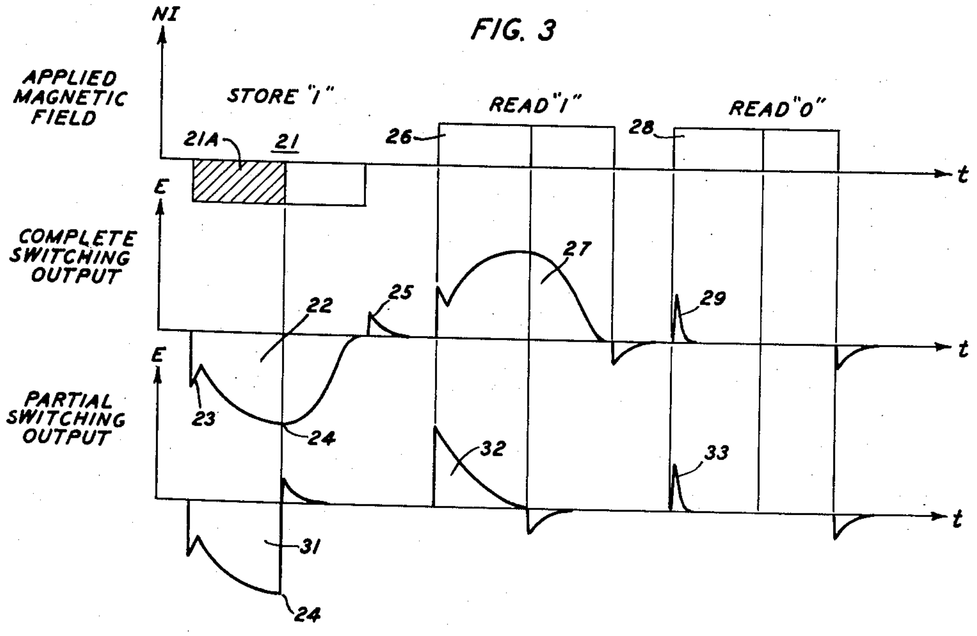
FIG. 3 depicts graphically input signals and the resultant output signals in a completely switched magnetic core and in a partially switched core in accordance with one embodiment of this invention.

FIG. 3 shows at 21 the magnetic field established in winding 12, FIG. 2, by an input current from source 15 applied for a period sufficiently long to permit complete switching of the core between remanent flux positions A and B in FIG. 1, as is known in the art. Such complete switching will permit the core to induce in the output winding 14 a voltage signal having substantially the configuration shown at 22. An initial voltage peak 23 is reached in passing from point A to threshold point C on the hysteresis loop of FIG. 1. Once past point C, or the knee of the curve, flux is switched in the core until saturation occurs in the direction of applied field, as at point D in FIG. 1. A second peak 24 in the output voltage wave 22 occurs approximately half way through the complete switching operation and a third peak 25 of opposite polarity is registered after removal of the applied field as the core returns from the saturation point D to the remanent flux position B.

Oppositely directed magnetic field 26, produced in winding 13 by a current pulse from source 17, will serve to restore the core from switched position B to its starting position A, again inducing a large voltage signal 27 in the output winding 14 but opposite in direction to signal 22. Magnetic field 28, acting in the same direction as the field 26 and induced in winding 13 with the core in the stable position A, will drive the core from A to E, thereby inducing the "noise" signal 29 in the output. Upon removal of field 28, the core again wil be restored to the original stable state of remanent flux A. This excursion of the core between A and E is referred to as "shuttling" of the core.

The output signals 27 and 29 may represent the two conditions for memory operation. Thus, a completely switched core producing output signal 27 may convey to the load 16 the knowledge that a binary "one" was stored in the core, and the output signal 29 that a binary "zero" was stored in the core. Ideally, signal 29 is at substantially zero voltage so that a clear distinction between the "one" and "zero" signals can be made in the sensing circuitry. Practically, however, the most precise rectangular loop cores available display hysteresis curves having a finite slope between the stable remanant flux position and the point of complete saturation in the same direction, so that some flux will be switched and a finite "noise" signal 29 induced in the output winding 14 in sensing the presence of a stored "zero." In cores exhibiting less rectangular hysteresis loops, the "noise" signal is larger in proportion to the switched core signal.

It was the popular belief, as shown in the prior art, that, in order to assure a clear distinction between "one" and "zero" magnetic core output signals, it was necessary to completely switch the magnetic core thereby obtaining a maximum "switched" signal which could be distinguished from the "noise" signal.

In order to achieve complete switching of a magnetic core, thereby deriving an output voltage signal such as 27 in FIG. 3, it is necessary to apply a magnetic driving field for a sufficient time to reverse substantially all of the core flux. The switching time is linearly related to the ampere turn drive as described by M. Karnaugh in an article of the May 1955 Proceedings of the IRE, vol 43, No. 4, pages 570 through 583, entitled "Pulse Switching Circuits Using Magnetic Cores." Also, the output voltage signal depends upon the rate of change of flux in the core. The switching time may be reduced, as desired in memory systems, by increasing either the applied current or the number of turns on the input winding. However, these expedients are impractical in many applications, as described more fully hereinafter.

In accordance with this invention, the current from pulse source 15, FIG. 2, applied to the input winding 12 to produce field 21, FIG. 3, is controlled by gating circuit 18 and timing circuit 19 so as to be cut off in a time less than that required to achieve complete switching of the magnetic core, thereby producing magnetic field 21A in winding 12. The output winding 14, of course, cannot recognize that the applied field 21 will be removed prematurely, so that at the outset, the resultant output voltage signal 31, FIG. 3, will have the waveform of signal 22. If the switching time is cut in half; i.e., application only of field 21A, signal 31 will reach the peak amplitude 24 and drop abruptly to zero. The core in turn will assume a partially switched position, for example, position F on the hysteresis loop of FIG. 1 representing a stored "one."

Applying an oppositely directed field 26 to the core in this condition for at least the same switching time as utilized for field 21A will restore the core to its original condition (point A, FIG. 1). Output signal 32 having a peak amplitude equivalent to that of signal 31 and representing a stored "one" will be induced in the output winding 14. Thereafter, upon application of field 28, equivalent to field 26, the core will move to saturation at E and return to A, producing a "noise" signal 33 comparable to signal 29.

The peak amplitude of the partially switched output signal 32, representing a "one" in this instance, is readily distinguished from the peak of the "noise" signal 33 representing a "zero," but only one-half the complete switching time was required to obtain these ouput signals. I have found also that a partially switched core output signal obtained by removing the excitation in less than one-half the time for complete switching has a peak amplitude sufficiently above the "nose" signal amplitude to permit accurate discrimination. Partial switching with excitation removed in approximately one-third of the complete switching time has produced satisfactory results.

The actual reduction in the time that current is applied to the input windings may be accomplished by pulse forming means well known in the art by determining the time required for complete switching due to a given input current and reducing the time of application of this input current below that required for complete switching.

Figure 6:
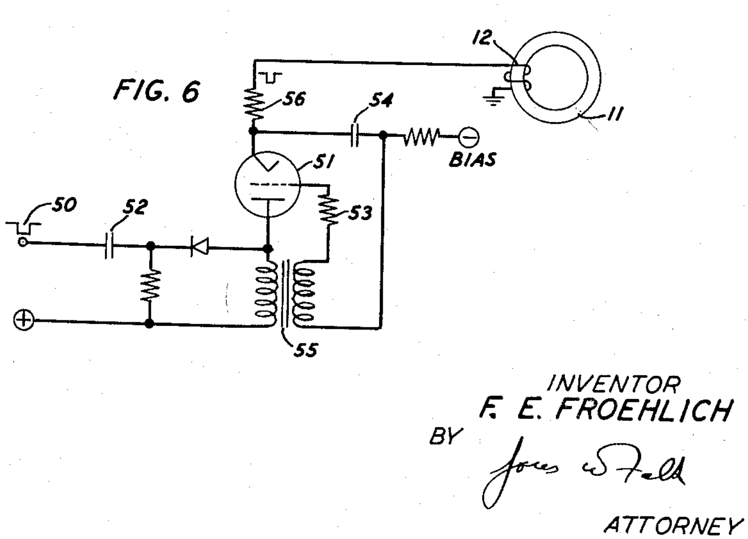
FIG. 6 depicts an input pulse circuit suitable for use in accordance with the embodiments of this invention.

An example of such pulse forming means is shown in FIG. 6. The circuit comprises a monostable, biased blocking oscillator having the magnetic cores to be pulsed connected in the cathode circuit of the blocking oscillator. The vacuum tube 51 is normally cut off. When a short negative pulse 50 is applied to condenser 52, tube 51 conducts for a period of time controlled by the resistance 53 and condenser 54 in addition to the characteristics of tube 51 and transformer 55. The current through the magnetic core windings is dependent upon resistance 56. With such a circuit, the duration of the current pulse applied to the input windings can be precisely controlled.

Figure 4:
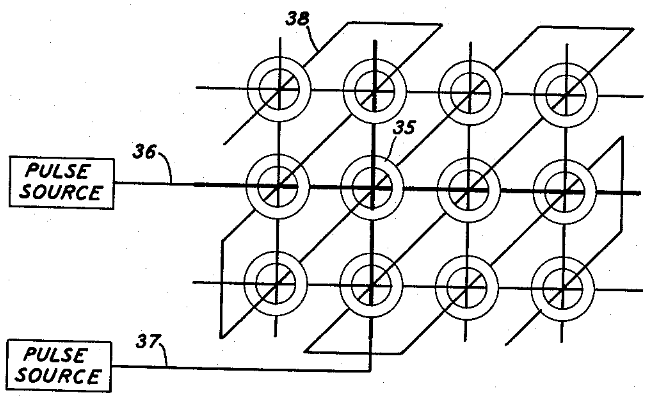
FIG. 4 depicts, in schematic form, one illustrative embodiment of this invention.

FIG. 4 illustrates the advantages of partial switching by timed, full switching pulses over complete switching in coincident current operation, a magnetic core operation which is well known in the art and is described in an article by J. A. Rajchman in the October 1953 Proceedings of the IRE, vol. 41, No. 10, pages 1407–1421, entitled "A Myriabit Magnetic Core Matrix Memory." A particular core such as 35 may receive signals on two distinct windings 36 and 37. Each input signal in FIG. 4 is limited to a value insufficient to drive the core beyond the threshold value or "knee" of the hysteresis loop, such as point C in FIG. 1. One such signal alone fails to switch the core, and the stored information remains undisturbed as the core is restored to point A. However, signals coinciding on leads 36 and 37 will permit complete switching of the core to point B, and a "one" signal will be stored. Interrogating the core 35 by again applying signals coincidently to leads 36 and 37 will produce the "one" signal in the output winding 38 common to all cores in the system. In this manner it is possible to control any one a plurality of magnetic cores with a minimum of control leads. It is apparent, therefore, that coincident current systems necessarily are limited to an input signal magnitude of twice that required to drive a core to the threshold value. It is apparent also that in a large scale memory of this type, employing many magnetic cores, an increase in the number of turns per coil is not feasible. Thus, in order to improve switching time in coincident current operation, the only available practical approach is, as in accordance with this invention, the application of shortened, full switching current pulses to the input leads such as 36 and 37 to effect partial switching. Advantageously, pulse forming means such as that shown in FIG. 6 may be employed in conjunction with the coincident current pulse sources for this purpose.

Figure 5:
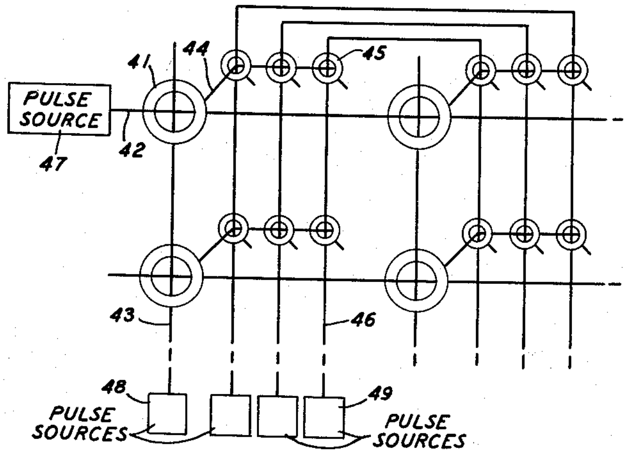
FIG. 5 depicts, in schematic form, another illustrative embodiment of this invention.

FIG. 5 illustrates another memory system advantageously utilizing partially switched magnetic cores in accordance with this invention. Due to its unique arrangement of groups of cores, this type of system is referred to generally as a word organized memory and is a modification of the coincident current memory described in the aforementioned Rajchman article.

In brief, the word organized memory comprises a matrix of control cores, and groups of "word" cores, an input winding of each core in a group being linked serially with the output winding of a control core. Each core is a group of "word" cores also has an input winding linked with a distinct input pulse source. The control cores provide output signals of one polarity for storage of signals in its associated group of "word" cores and of opposite polarity for sensing or reading out the information stored in the associated "word" cores.

Information is stored in the "word" cores in a coincident current manner. Thus, during the storage operation, coincidence of signals of the same polarity on both input windings of a "word" core will switch the "word" core and store a "one" signal, while a signal from the control core alone will fail to switch the "word" core and store a "zero" signal. During the reading operation, an opposite polarity signal from the control core of arbitrary magnitude switches the associated "word" cores which priorly stored a "one," thereby producing a large output signal from such cores. The same control core output signal will produce a small "noise" signal from those "word" cores storing a "zero." In this fashion a degree of flexibility is obtained, since coincident current operation is required only during the storage operation, and a group of cores may be sensed by activating a single control core. Thus, in FIG. 5, control core 41 in the matrix is switched by concurrence of input pulses from sources 47 and 48 over leads 42 and 43 respectively. Core 41 is switched so as to provide an output pulse on lead 44 of one polarity during storage and opposite polarity during reading. The group of "word" cores, including core 45, receives the output signal from control core 41. Each word core in the group also has an input winding linked to an individual pulse source; thus, core 45 is linked to pulse source 49 over lead 46. If it is desired to store a "one" in core 45, lead 46 is pulsed during the storage operation. Concurrence of signals on leads 46 and 44 will then cause core 45 to switch. Absent a pulse on lead 46, the pulse on lead 44 alone is insufficient to switch core 45, and a "zero" will be stored therein.

Advantageously, a bias current may be applied to the "word" cores to reduce operating time and to facilitate switching of the "word" cores by the opposite polarity control core output signal during the reading operation. In order to retain two stable operating states, the bias current $I_b$ may not exceed a value which would move the operating point near the threshold value on the hysteresis curve, as shown in FIG. 1. The control core output signal now is adjusted so as to produce a field sufficient to switch the "word" core from the bias position H to the threshold position C. A coincident current at the other input to the "word" core during the storage operation then will switch the core to position J, storing a "one" therein.

During the reading operation, an opposite polarity signal from the control core, will switch those "word" cores storing a "one" from position J to position H, and a "one" output signal will be provided. Those "word" cores storing a "zero" will merely switch from position H to position E and back to H, thereby providing the "zero" or "noise" output signal.

In order to further reduce operating time, in accordance with this invention, the various input pulses are cut off prematurely, resulting in partial switching of the cores. Thus, concurrent pulses of one polarity on leads 42 and 43 of sufficient combined magnitude to completely switch core 41 but applied for a lesser time, will result in partial switching of core 41. The output on lead 44, due to such partial switching, is sufficient to perform the switching function in core 45. Similarly, early cutoff of the input pulse on lead 46 to core 45, during the information storage operation, will result in partial switching of core 45.

Concurrent receipt during the storage operation of a negative signal on lead 44 and a negative signal of similar magnitude on lead 46, also applied for a reduced period, will drive the core 45 to partially switched bias position F, FIG. 1. A positive signal on lead 44 during the reading operation now will switch the "word" core 45 from position G through E to H, supplying a "one" output signal which is easily distinguishable from the "noise" signal representing a "zero."

Reducing the duration of pulses applied by the various sources, such as 47, 48 and 49, provides a significant improvement in the overall operating time of the word organized memory system. Advantageously, a circuit such as that shown in FIG. 6 may be employed for this purpose. Since the current applied during reading need not be limited as required in coincident current operation, operating speed during reading is limited solely by the switching time, and a considerable improvement is realized through partial switching. I have found that satisfactory differentiation between switching and noise signals is possible, in accordance with this invention, with a reduction of the time of applied signal to as little as one-third of the time required for complete switching.

It is to be understood that the above-described arrangements are illustrative of the application of the principles of the invention. Numerous other arrangements may be devised by those skilled in the art without departing from the spirit and scope of this invention. Specifically it is to be appreciated that the implementation of the principles and inventive concepts of my invention depicted in FIGS. 2 and 6 of the drawing are merely illustrative embodiments and that various other specific embodiments may be realized within the scope of this invention. Thus, only a single pulse source or single input winding could be utilized for both the storing and reading operations and various other timing arrangements and circuits for inhibiting the full switching current pulse before complete switching of the core could be employed.

What is claimed is:

1. In a magnetic core memory circuit in which opposite binary states are represented by first and second output signals of distinct amplitudes to permit accurate discrimination, a completely switched core providing said first output signal and the shuttling of the core providing said second output signal, the method for increasing the speed of operation of the memory circuit through partial magnetic core switching comprising the steps of applying an input signal of one polarity to said core in one state of remanent magnetization sufficient to drive said core to the other state of remanent magnetization in a minimum time, removing said input signal in a time less than said minimum time to place said core in a partially switched state and within a range in which the output signal resulting from restoration of the partially switched core to said one state is equivalent in amplitude to said first output signal, applying a signal of opposite polarity to said partially switched core to restore the partially switched core to said one state, and applying said signal of opposite polarity to said core in said one state to derive said second output signal.

2. The method for deriving distinct output signals from the switching of a magnetic core comprising the steps of applying an input signal of one polarity to said core in one state of remanent magnetization to derive a first output signal of a distinct amplitude, applying an input signal of opposite polarity to said core sufficient to drive said core to the other state of remanent magnetization in a minimum time, removing said opposite polarity input signal in a time between one-third and two-thirds of said minimum time to leave said core in a partially switched state, and applying said one polarity input signal to said core in said partially switched state to derive a second output signal equivalent in amplitude to an output signal derived from complete switching of the magnetic core between the opposite states of remanent magnetization.

3. The method for deriving a distinct output signal from a partially switched magnetic core equivalent in amplitude to an output signal derived from said magnetic core when completely switched comprising the steps of applying a magnetic field to said core magnetically saturated in one direction of sufficient magnitude to switch said core to magnetic saturation in the opposite direction, removing the magnetic field from said core after approximately one-third of the switching interval and prior to reaching magnetic saturation in the opposite direction so as to leave said core in a partially switched state, and applying an oppositely directed magnetic field to said core in said partially switched state of sufficient magnitude to switch said core to magnetic saturation in said one direction to derive said distinct output signal.

References Cited in the file of this patent

UNITED STATES PATENTS

| | | |
|---|---|---|
| 2,666,151 | Rajchman et al. | Jan. 12, 1954 |
| 2,734,187 | Rajchman | Feb. 7, 1956 |
| 2,808,578 | Goodell et al. | Oct. 1, 1957 |
| 2,834,894 | Steagall | May 13, 1958 |
| 2,856,584 | Stratton | Oct. 14, 1958 |
| 2,898,580 | Kelly | Aug. 4, 1959 |
| 2,901,636 | Torrey et al. | Aug. 25, 1959 |

OTHER REFERENCES

Proceedings of the IRE, April 1955, "A Survey of Magnetic Amplifiers," by C. W. Lufcy, pp. 404 to 413.